United States Patent
Meiri et al.

(10) Patent No.: US 10,997,072 B1
(45) Date of Patent: May 4, 2021

(54) HOST-BASED ACCELERATION OF A CONTENT ADDRESSABLE STORAGE SYSTEM

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/654,826

(22) Filed: Oct. 16, 2019

(51) Int. Cl.
*G06F 12/0804* (2016.01)
*G06N 20/00* (2019.01)
(Continued)

(52) U.S. Cl.
CPC ...... *G06F 12/0804* (2013.01); *G06F 11/3024* (2013.01); *G06F 11/3034* (2013.01); *G06F 11/3409* (2013.01); *G06F 12/1018* (2013.01); *G06F 12/122* (2013.01); *G06F 12/126* (2013.01); *G06F 13/1668* (2013.01); *G06N 20/00* (2019.01); *H04L 9/3236* (2013.01); *H04L 9/3247* (2013.01); *G06F 2212/652* (2013.01)

(58) Field of Classification Search
CPC ............. G06F 11/3024; G06F 11/3034; G06F 11/3409; G06F 12/0804; G06F 12/1018; G06F 12/122; G06F 12/126; G06F 13/1668; G06F 2212/652; G06N 20/00; H04L 9/3236; H04L 9/3247
See application file for complete search history.

(56) References Cited

U.S. PATENT DOCUMENTS 7,444,464 B2   10/2008  Urmston et al.
8,095,726 B1   1/2012   O'Connell et al.
(Continued)

FOREIGN PATENT DOCUMENTS

WO   2016111954 A1   7/2016

OTHER PUBLICATIONS

EMC Corporation, "Introduction to the EMC XtremIO Storage Array (Ver. 4,0): A Detailed Review," White Paper, Apr. 2015, 65 pages.
(Continued)

*Primary Examiner* — Larry T Mackall
(74) *Attorney, Agent, or Firm* — Ryan, Mason & Lewis, LLP

(57) ABSTRACT

An apparatus in one embodiment comprises at least one processing device comprising a processor coupled to a memory, with the processing device being configured to obtain content-based signatures for respective data pages of at least one write operation, to send the content-based signatures to a content addressable storage (CAS) system, and to receive from the CAS system information indicating for each of the content-based signatures whether or not the corresponding data page is present in the CAS system. Responsive to the information received from the CAS system indicating that one or more of the corresponding data pages are not present in the CAS system, the processing device sends the one or more corresponding data pages to the CAS system. The processing device illustratively comprises a host device coupled to the CAS system over a network.

20 Claims, 6 Drawing Sheets

(51) Int. Cl.
*G06F 12/1018* (2016.01)
*H04L 9/32* (2006.01)
*G06F 12/126* (2016.01)
*G06F 13/16* (2006.01)
*G06F 11/30* (2006.01)
*G06F 11/34* (2006.01)
*G06F 12/122* (2016.01)

(56) References Cited

U.S. PATENT DOCUMENTS

| | | | |
|---|---|---|---|
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 10,007,455 | B1* | 6/2018 | George ............... G06F 3/0637 |
| 10,120,893 | B1* | 11/2018 | Rocamora ............ G06F 16/137 |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,437,501 | B1 | 10/2019 | Kucherov et al. |
| 10,437,855 | B1 | 10/2019 | Stronge et al. |
| 2006/0235821 | A1* | 10/2006 | Armangau ......... G06F 16/2477 |
| 2008/0279462 | A1 | 11/2008 | Celi, Jr. |
| 2009/0132955 | A1 | 5/2009 | Garg et al. |
| 2010/0042790 | A1* | 2/2010 | Mondal ................ G06F 3/0641 711/161 |
| 2010/0179941 | A1 | 7/2010 | Agrawal et al. |
| 2010/0250858 | A1* | 9/2010 | Cremelie ........... G06F 16/1752 711/136 |
| 2013/0325824 | A1 | 12/2013 | Shoens |
| 2014/0181016 | A1 | 6/2014 | Whitehead et al. |
| 2014/0244598 | A1* | 8/2014 | Haustein ............. H04L 63/123 707/692 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2019/0026303 | A1* | 1/2019 | Guerra Delgado ......................... G06F 16/2237 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO(Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 16/037,050, filed in the name of Ying Hu et al. on Jul. 17, 2018 and entitled "Storage System with Multiple Write Journals Supporting Synchronous Replication Failure Recovery.".

U.S. Appl. No. 16/253,793, filed in the name of Yuval Harduf et al. on Jan. 22, 2019 and entitled "Storage System with Data Consistency Checking in Synchronous Replication Using Active Snapshot Set.".

U.S. Appl. No. 16/396,897, filed in the name of Anton Kucherov et al, on Apr. 29, 2019 and entitled "Storage System With Deduplication-Aware Replication Implemented Using a Standard Storage Command Protocol.".

U.S. Appl. No. 16/413,050, filed in the name of Xiangping Chen et al, on May 15, 2019 and entitled "Storage System with Coordinated Recovery across Multiple Input-Output Journals of Different Types.".

Y. Zhang et al., "End-to-End Integrity for File Systems: A ZFS Case Study," Proceedings of the 8th USENIX Conference on File and Storage Technologies (FAST), Feb. 23-26, 2010, 14 pages.

* cited by examiner

HOST-BASED ACCELERATION OF A CONTENT ADDRESSABLE STORAGE SYSTEM

FIELD

The field relates generally to information processing systems, and more particularly to storage in information processing systems.

BACKGROUND

Various types of content addressable storage (CAS) systems are known. Typical CAS systems allow data pages of one or more logical storage volumes to be accessed using content-based signatures that are computed from content of respective ones of the data pages. Such CAS system arrangements facilitate implementation of deduplication and compression. For example, the storage system need only maintain a single copy of a given data page even though that same data page may be part of multiple logical storage volumes. Although these and other CAS systems typically provide a high level of storage efficiency through deduplication and compression, problems can arise under certain conditions. For example, conventional techniques for writing data to a CAS system typically require a host device to send all of the data pages of a given write operation to the storage system over a network, with only very narrow exceptions, such as writing all-zero data pages. This requirement to transmit substantially all data pages for each write operation can cause bandwidth congestion on one or more switch fabrics of the network, adversely impacting storage system response times.

SUMMARY

Illustrative embodiments provide techniques for host-based acceleration of a CAS system. For example, some embodiments provide functionality referred to herein as "write-via-signature" that can substantially reduce the amount of data transmitted between the host and the CAS system, thereby accelerating the processing of both write operations and read operations by the CAS system.

In one embodiment, an apparatus comprises at least one processing device comprising a processor coupled to a memory. The processing device is configured to obtain content-based signatures for respective data pages of at least one write operation, to send the content-based signatures to a CAS system, and to receive from the CAS system information indicating for each of the content-based signatures whether or not the corresponding data page is present in the CAS system. Responsive to the information received from the CAS system indicating that one or more of the corresponding data pages are not present in the CAS system, the processing device sends the one or more corresponding data pages to the CAS system.

The processing device illustratively comprises a host device coupled to the CAS system over a network, although other types and arrangements of one or more processing devices can be used. In some embodiments, a host device comprises a multi-path input-output (MPIO) driver configured to control delivery of input-output (TO) operations from the host device to the CAS system over selected ones of a plurality of paths through the network. The IO operations comprise write operations and read operations. The paths are illustratively associated with respective initiator-target pairs, with each of a plurality of initiators of the initiator-target pairs comprising a corresponding host bus adaptor (HBA) of the host device and each of a plurality of targets of the initiator-target pairs comprising a corresponding port of the CAS system.

The obtaining of content-based signatures for respective data pages of at least one write operation illustratively comprises determining a native page size and a content-based signature generation algorithm utilized by the CAS system, separating data of the write operation into a plurality of data pages each having the native page size, and computing content-based signatures for respective ones of the data pages of the write operation utilizing the content-based signature generation algorithm.

The content-based signatures in some embodiments comprise respective hash digests of respective data pages of a logical storage volume, with a given one of the hash digests being generated by applying a secure hashing algorithm to content of a corresponding one of the data pages of the logical storage volume. The logical storage volume comprises at least a portion of a physical storage space of one or more storage devices.

In some embodiments, sending the content-based signatures to the CAS system comprises generating a write-via-signature command that includes the content-based signatures and specifies a logical storage volume and logical address information for the data pages within the logical storage volume, and sending the write-via-signature command to the CAS system. The write-via-signature command illustratively comprises a vendor unique command of a designated storage protocol, such as a SCSI protocol or an NVMe protocol, although other types of commands can be used.

The information received from the CAS system and indicating for each of the content-based signatures whether or not the corresponding data page is present in the CAS system illustratively comprises a bitmap, with the bitmap comprising a plurality of entries for respective ones of the data pages, and with each such entry of the bitmap indicating whether or not the corresponding data page is present in the CAS system.

The processing device may be further configured, responsive to the information received from the CAS system indicating that all of the corresponding data pages are present in the CAS system, to designate the write operation as complete without sending any of the data pages to the CAS system. The CAS system in such an embodiment increments respective reference counts for the content-based signatures of the corresponding data pages in conjunction with sending the information to the processing device that indicates that all of the corresponding data pages are present. The CAS system also updates one or more associated mapping tables utilized for logical address to physical address mapping in the CAS system.

Additionally or alternatively, for any of the data pages that are present in the CAS system, the CAS system initiates respective deletion prevention timers for respective ones of their content-based signatures in conjunction with sending the information to the processing device. A particular one of the deletion prevention timers is configured to prevent the corresponding content-based signature from being deleted in the event its reference count reaches zero before expiration of the timer. After expiration of the particular deletion prevention counter, its corresponding content-based signature is deleted responsive to its reference count reaching zero.

In some embodiments, if the information received from the CAS system indicates that none of the corresponding data pages are present in the CAS system, sending the one or more corresponding data pages to the CAS system illustratively comprises generating a write command that includes (i) all of the data pages, and (ii) specification of a logical storage volume and logical address information for the data pages within the logical storage volume, and sending the write command to the CAS system.

Additionally or alternatively, if the information received from the CAS system indicates that one or more of the corresponding data pages are present in the CAS system and one or more other data pages are not present in the CAS system, sending the one or more corresponding data pages to the CAS system illustratively comprises generating a write command that includes (i) the one or more corresponding data pages that are not present, (ii) the content-based signatures of at least the one or more other data pages that are present, (iii) specification of a logical storage volume and logical address information for the data pages within the logical storage volume, and (iv) the information indicating for each of the content-based signatures whether or not the corresponding data page is present, and sending the write command to the CAS system.

The write-via-signature commands and other write commands generated in the manner described above illustratively comprise respective commands of a designated storage protocol, such as an iSCSI protocol or other type of SCSI protocol, or an NVMe protocol. The host-based acceleration functionality in such embodiments leverages the designated storage protocol to carry acceleration-related information between a host device and a storage system without the need for a proprietary protocol.

Numerous other embodiments are disclosed herein. For example, some embodiments implement machine learning functionality in conjunction with host-based acceleration of a CAS system. In illustrative embodiments of this type, a host device or other type of processing device comprising a machine learning system is configured to generate multiple write-via-signature commands for respective write operations, to monitor performance of the write-via-signature commands in terms of numbers of data pages present in the CAS system, and to control a manner in which additional write-via-signature commands are generated for respective additional write operations based at least in part on comparison of the monitored performance to a specified threshold, with the generating, monitoring and controlling being implemented at least in part by the machine learning system. For example, the machine learning system can be configured to increase or decrease the percentage of write operations that utilize write-via-signature commands based at least in part on whether the monitored performance is above or below the specified threshold, respectively.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
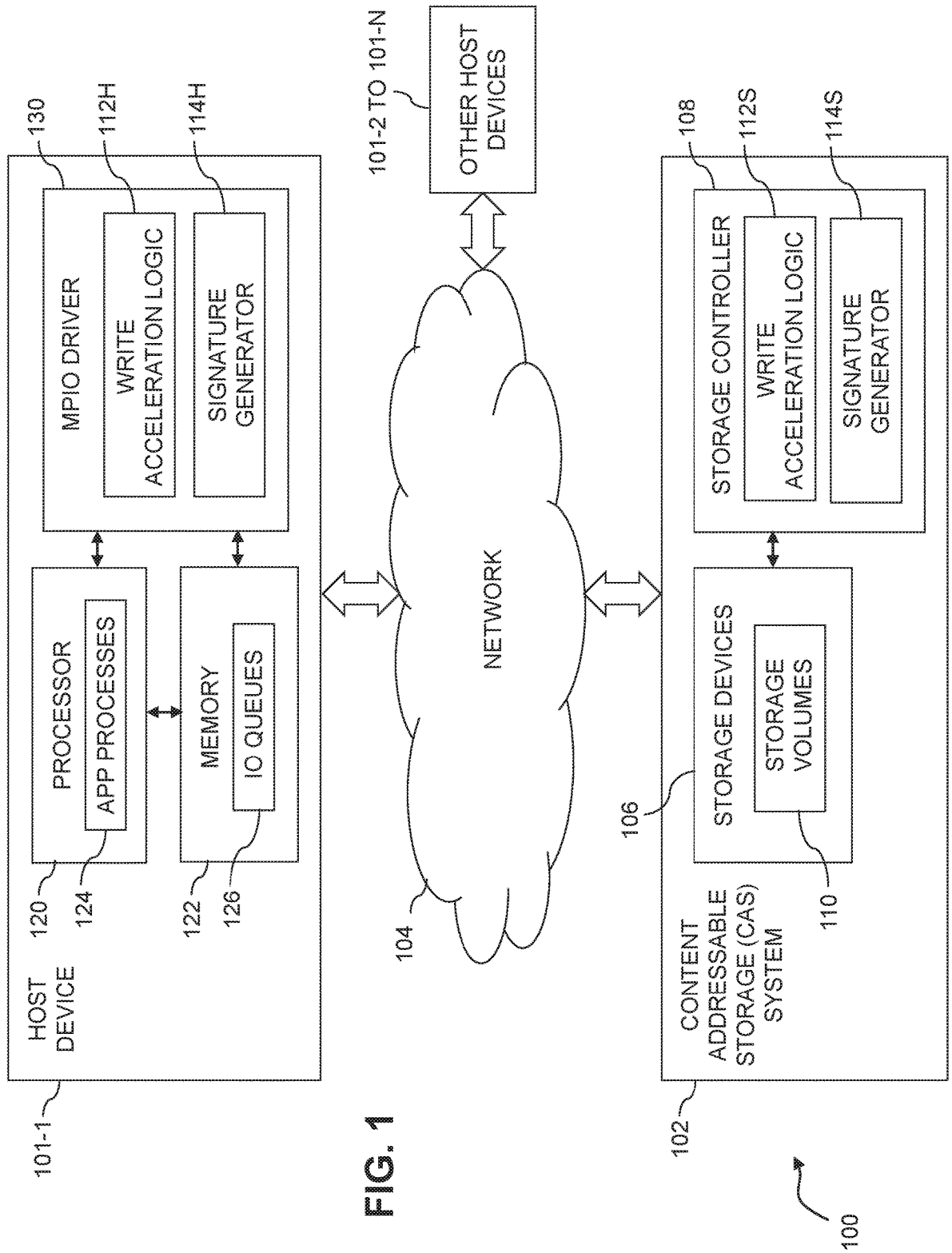
FIG. 1 is a block diagram of an information processing system comprising a host device implementing functionality for host-based acceleration of a CAS system in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a CAS system 102. The host devices 101 are configured to communicate with the CAS system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (10) operations that are processed by the CAS system 102. The term "input-output" as used herein refers to at least one of input and output. For example, 10 operations may comprise write requests and/or read requests directed to logical addresses of a particular logical storage volume of the CAS system 102. These and other types of IO operations are also generally referred to herein as IO requests.

The CAS system 102 illustratively comprises processing devices of one or more processing platforms. For example, the CAS system 102 can comprise one or more processing devices each having a processor and a memory, possibly implementing virtual machines and/or containers, although numerous other configurations are possible.

The CAS system 102 can additionally or alternatively be part of cloud infrastructure such as an Amazon Web Services (AWS) system. Other examples of cloud-based systems that can be used to provide at least portions of the CAS system 102 include Google Cloud Platform (GCP) and Microsoft Azure.

The host devices 101 and the CAS system 102 may be implemented on a common processing platform, or on separate processing platforms. The host devices 101 are illustratively configured to write data to and read data from the CAS system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The CAS system 102 comprises a plurality of storage devices 106 and an associated storage controller 108. The storage devices 106 store data of a plurality of storage volumes 110. The storage volumes 110 illustratively comprise respective logical units (LUNs) or other types of logical storage volumes.

The storage devices 106 of the CAS system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in CAS system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the CAS system 102 illustratively comprises a scale-out all-flash content addressable storage array such as an XtremIO™ storage array from Dell EMC of Hopkinton, Mass. A wide variety of other types of storage arrays can be used in implementing a given one of the CAS system 102 in other embodiments, including by way of example one or more VNX®, VIVIAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to CAS systems based on flash memory or other types of NVM storage devices. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the CAS system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the CAS system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

A particular one of the host devices 101 is shown in greater detail than the other host devices 101 in FIG. 1. This is the first host device 101-1, which implements functionality for host-based acceleration of the CAS system 102 using write acceleration logic 112H and signature generator 114H. The write acceleration logic 112H is illustratively configured to control the performance of a host-side process for host-based acceleration of the CAS system 102, such as the host-side process to be described below in conjunction with FIG. 2. The signature generator 114H is configured to generate hash digests, hash handles and/or other content-based signatures of respective data pages. Each of one or more of the other host devices 101 of system 100 can be similarly configured to implement functionality for host-based acceleration of the CAS system 102.

The storage controller 108 of CAS system 102 in the FIG. 1 embodiment includes write acceleration logic 112S for supporting host-based acceleration of the CAS system 102 and a signature generator 114S. The write acceleration logic 112S is illustratively configured to control the performance of a storage-side process for host-based acceleration of the CAS system 102, such as the storage-side process to be described below in conjunction with FIG. 3. The signature generator 114S, like the signature generator 114H of the host device 101-1, is configured to generate hash digests, hash handles and/or other content-based signatures of respective data pages. The storage controller 108 can also include additional elements, such as replication control logic for controlling replication of one or more of the storage volumes 110 to another CAS system not shown in the figure.

The storage controller 108 and the CAS system 102 may further include one or more additional modules and other components typically found in conventional implementations of storage controllers and storage systems, although such additional modules and other components are omitted from the figure for clarity and simplicity of illustration.

The host device 101-1 further comprises a processor 120 coupled to a memory 122. The host device 101-1 is therefore an example of what is more generally referred to herein as a processing device comprising a processor coupled to a memory. The processor 120 executes application ("app") processes 124 of one or more applications on behalf of each of one or more users of the host device 101-1. Such application process execution results in the generation of write operations and read operations that are directed by the host device 101-1 to the CAS system 102 in the manner disclosed herein.

The IO operations generated by the application processes 124 are placed in one or more IO queues 126 to await further processing of the type to be described below. The IO queues 126 are illustratively shown as part of the memory 122 of the host device 101-1, but could be implemented elsewhere in the host device 101-1.

The MPIO driver 130 is illustratively configured to control delivery of IO operations from the host device 101-1 to the CAS system 102 over selected ones of a plurality of paths through the network 104. The paths are associated with respective initiator-target pairs, with each of a plurality of initiators of the initiator-target pairs comprising a corresponding host bus adaptor (HBA) of the host device 101-1, and each of a plurality of targets of the initiator-target pairs comprising a corresponding port of the CAS system 102.

The MPIO driver 130 may comprise, for example, an otherwise conventional MPIO driver, such as a PowerPath® driver from Dell EMC, suitably modified in the manner disclosed herein to provide host-based acceleration functionality for a CAS system. Other types of MPIO drivers from other driver vendors may be suitably modified to incorporate functionality for host-based acceleration of a CAS system as disclosed herein.

The term "MPIO driver" as used herein is intended to be broadly construed, and such a component is illustratively implemented at least in part as a combination of software and hardware. For example, MPIO driver 130 can comprise one or more software programs running on processor 120 of host device 101-1.

The MPIO driver 130 is configured to deliver IO operations selected from its corresponding IO queues 126 to the CAS system 102 via selected ones of multiple paths over the network 104. The sources of the IO operations stored in the IO queues 126 illustratively include respective application processes 124 of one or more applications executing on the host device 101-1. For example, IO operations can be generated by each of multiple processes of a database application running on the host device 101-1. Such processes issue IO operations for delivery to the CAS system 102 over the network 104. Other types of sources of IO operations may be present in a given implementation of system 100.

In accordance with the above-noted functionality for host-based acceleration of the CAS system 102, the host device 101-1 is illustratively configured to obtain content-based signatures for respective data pages of at least one write operation, to send the content-based signatures to the CAS system 102, and to receive from the CAS system 102 information indicating for each of the content-based signatures whether or not the corresponding data page is present in the CAS system 102. Responsive to the information received from the CAS system 102 indicating that one or more of the corresponding data pages are not present in the CAS system 102, the host device 101-1 sends the one or more corresponding data pages to the CAS system 102 over the network 104. Additional details regarding particular implementations of such operations will be provided below.

These and other operations related to host-based acceleration of CAS system 102 as disclosed herein are illustratively implemented at least in part by or otherwise under the control of write acceleration logic 112H, which interacts with write acceleration logic 112S of the CAS system 102. One or more such operations can be additionally or alternatively controlled by one or more other system components in other embodiments.

It should also be noted that the functionality for host-based acceleration of CAS system 102 as described herein with reference to host device 101-1 can additionally or alternatively be implemented by each of one or more of the additional host devices 101-2 through 101-N. For example, each of the host devices 101 can be configured to include substantially the same functionality for host-based acceleration of CAS system 102 via their respective instances of write acceleration logic.

The CAS system 102 is illustratively implemented as a distributed storage system, also referred to herein as a clustered storage system, in which such a storage system comprises a plurality of storage nodes each comprising a set of processing modules configured to communicate with corresponding sets of processing modules on other ones of the storage nodes. The sets of processing modules of the storage nodes of the CAS system 102 collectively comprise at least a portion of the storage controller 108 of the CAS system 102. For example, in some embodiments the sets of processing modules of the storage nodes collectively comprise a distributed storage controller of the distributed storage system.

In the CAS system 102, logical addresses of data pages are mapped to physical addresses of the data pages using respective content-based signatures that are generated from those data pages.

The term "page" as used in this and other contexts herein is intended to be broadly construed so as to encompass any of a wide variety of different types of blocks that may be utilized in a block storage device of a storage system. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing data pages of the CAS system 102.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In some embodiments, various types of address metadata are utilized to provide content addressable storage functionality in the CAS system 102. The address metadata in some embodiments comprises at least a portion of one or more logical layer mapping tables that map logical addresses of respective ones of the data pages of a storage volume to corresponding content-based signatures of the respective data pages. Examples of logical layer mapping tables and other metadata structures maintained by the storage controller 108 of CAS system 102 will be described below.

Also, the term "storage volume" as used herein is intended to be broadly construed, and should not be viewed as being limited to any particular format or configuration.

It is assumed in some embodiments that the processing modules of a distributed storage controller are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller of the type described above can include control modules, data modules, routing modules and at least one management module. These and possibly other modules of the distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

The management module communicates with the control modules, and the control modules communicate with the data modules. In some embodiments, each of the storage nodes of the distributed storage system comprises one of the control modules and one of the data modules, as well as one or more additional modules including one of the routing modules. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Another example of a CAS system configured to support functionality for host-based acceleration will be described in conjunction with FIG. 4 below.

The processing modules of a given distributed storage controller as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments.

In some embodiments, certain ones of the above-described mapping tables are maintained by particular modules of a distributed storage controller. For example, the mapping tables maintained by the control modules illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules may further comprise additional components such as respective messaging interfaces that are utilized by the control modules to generate control-to-routing messages for transmission to the routing modules, and to process routing-to-control messages received from the routing modules. Such messaging interfaces can also be configured to generate messages for transmission to the management module and to process instructions and other messages received from the management module.

The data modules comprise respective control interfaces. These control interfaces support communication between the data modules and corresponding ones of the control modules. Also included in the data modules are respective SSD interfaces. These SSD interfaces support communications with corresponding ones of the storage devices 106 of the distributed storage system.

The above-described processing module arrangements are presented by way of example only, and can be varied in other embodiments.

In some embodiments, a given data path of the CAS system 102 comprises a control module, a data module and a routing module that are configured to handle different stages of the data path. For example, a given IO request can comprise a write request received in a control module from a routing module.

Additional aspects of the host-based acceleration functionality implemented by host device 101-1 and CAS system 102 in system 100 of FIG. 1 will now be described in greater detail. As mentioned previously, the host device 101-1 is illustratively configured to obtain content-based signatures for respective data pages of at least one write operation, to send the content-based signatures to the CAS system 102, and to receive from the CAS system 102 information indicating for each of the content-based signatures whether or not the corresponding data page is present in the CAS system 102.

In some embodiments, obtaining content-based signatures for respective data pages of at least one write operation comprises the host device 101-1 determining a native page size and a content-based signature generation algorithm utilized by CAS system 102, separating data of the write operation into a plurality of data pages each having the native page size, and computing content-based signatures for respective ones of the data pages of the write operation utilizing the content-based signature generation algorithm. The content-based signature generation algorithm illustratively comprises a particular one of the secure hashing algorithms referred to elsewhere herein, such as SHA1, SHA2 or SHA256. The host device 101-1 can determine the native page size and content-based signature generation algorithm utilized by CAS system 102 by interacting with the CAS system 102 using commands of a designated storage protocol, such as an iSCSI or NVMe protocol. Alternatively, the host device 101-1 can be configured to incorporate knowledge of such storage-side operating parameters at host initialization or at other times by a host administrator or other system user. The host device 101-1 uses its signature generator 114H to compute the content-based signatures for respective ones of the data pages of the write operation in accordance with the appropriate content-based signature generation algorithm utilized by CAS system 102.

By way of example, assume that the write operation has a total data size of 32 KB and the native page size of the CAS system 102 is 8 KB. The data of such a write operation is separated into a plurality of data pages each having the native page size by separating the 32 KB data into four data pages of 8 KB each. Hash digests are then computed for each 8 KB data page using SHA1 or other appropriate algorithm.

In sending the content-based signatures to the CAS system 102, the host device 101-1 illustratively generates what is referred to herein as a "write-via-signature" command. The write-via-signature command includes the content-based signatures of the respective data pages of the write operation and specifies a particular logical storage volume and logical address information for those data pages within the logical storage volume. The particular logical storage volume is illustratively one of the storage volumes 110 of the CAS system 102. The host device 101-1 then sends the write-via-signature command to CAS system 102 over a particular path selected by the MPIO driver 130.

The write-via-signature command in some embodiments comprises a vendor unique command of a designated storage protocol, such as a given one of the above-noted SCSI or NVMe storage protocols. Other types of commands or combinations of multiple commands can be used in other embodiments.

The information received in the host device 101-1 from the CAS system 102 and indicating for each of the content-based signatures whether or not the corresponding data page is present in CAS system 102 illustratively comprises at least one bitmap. The bitmap comprises a plurality of entries for respective ones of the data pages with each such entry indicating whether or not the corresponding data page is present in CAS system 102. For example, the bitmap entry corresponding to a given one of the data pages can include a logic "1" value if that data page is present in the CAS system 102 and a logic "0" value if that data page is not present in the CAS system 102. Thus, again by way of example, if the write operation includes four data pages, a bitmap of 1111 indicates that all of the data pages are present, a bitmap of 0000 indicates that none of the data pages are present, and a bitmap of 0101 indicates that the second and fourth data pages are present but the first and third data pages are not present.

Other types and arrangements of information can be sent from the CAS system 102 to the host device 101-1 in order to indicate to the host device 101-1 the presence or absence in the CAS system 102 of each data page of the write operation, and so use of bitmaps should not be viewed as a requirement.

In addition, in some embodiments, the host device 101-1 can be configured to read such a bitmap or other similar information from a designated location of the CAS system 102, possibly using standard or vendor unique commands of a storage protocol, such as mode sense or log sense commands of the storage protocol. The information received from the CAS system 102 indicating that one or more of the corresponding data pages are not present in the CAS system 102 can therefore be affirmatively sent by the CAS system 102 responsive to the write-via-signature command, or obtained by the host device 101-1 in other ways, such as reading such information from the CAS system 102. These and other arrangements are intended to be encompassed by the general recitation of "receiving information" from the CAS system 102.

Also as indicated previously, responsive to the information received from the CAS system 102 indicating that one or more of the corresponding data pages are not present in the CAS system 102, the host device 101-1 sends the one or more corresponding data pages to the CAS system 102 over the network 104.

For example, if the information received from CAS system 102 indicates that none of the corresponding data pages are present in CAS system 102, the host device 101-1 sends the one or more corresponding data pages to CAS system 102 by generating a write command that includes (i) all of the data pages, and (ii) specification of a logical storage volume and logical address information for the data pages within the logical storage volume, and sending the write command to CAS system 102 via the MPIO driver 130.

If the information received from CAS system 102 indicates that one or more of the corresponding data pages are present in CAS system 102 and one or more other data pages are not present in CAS system 102, host device 101-1 sends the one or more corresponding data pages to CAS system 102 by generating a write command that includes (i) the one or more corresponding data pages that are not present, the content-based signatures of at least the one or more other data pages that are present, (iii) specification of a logical storage volume and logical address information for the data pages within the logical storage volume, and (iv) the information indicating for each of the content-based signatures whether or not the corresponding data page is present, and sends the write command to CAS system 102.

However, if the information received from the CAS system 102 indicates that all of the corresponding data pages are present in CAS system 102, the host device 101-1 designates the write operation as complete without sending any of the data pages to CAS system 102. In this case, the CAS system 102 completes the write operation without receiving any further command from the host device 101-1, illustratively by incrementing respective reference counts for the content-based signatures of the corresponding data pages in conjunction with sending the information to host device 101-1 that indicates that all of the corresponding data pages are present, and updating one or more associated mapping tables, such as one or more of the above-noted A2H, H2D, HMD and PLB tables, that are utilized for logical address to physical address mapping in CAS system 102. In this case, a bitmap or other information indicating that all pages are present can itself serve as an acknowledgement of the completion of the incrementing and updating operations from the CAS system 102 back to the host device 101-1. Other types of acknowledgements can be used in other embodiments.

In some embodiments, for any of the data pages that are present in CAS system 102, CAS system 102 initiates respective deletion prevention timers for respective ones of their content-based signatures in conjunction with sending the information to host device 101-1. A particular one of the deletion prevention timers is configured to prevent the corresponding content-based signature from being deleted by the CAS system 102 in the event its reference count reaches zero before expiration of the timer. After expiration of the particular deletion prevention counter, its corresponding content-based signature is deleted by the CAS system 102 responsive to its reference count reaching zero.

A suitable initial value for use in setting a given one of the deletion prevention timers is 1 second, although other values can be used. The deletion prevention timers in some embodiments can be implemented, for example, utilizing a dynamic linked list of content-based signatures that are currently protected, some of which may already have reference counts of zero but are not deleted due to the protection.

The host device 101-1 in some embodiments is further configured to modify the extent to which it utilizes write-via-signature commands for respective write operations based at least in part on monitoring the performance of previous write-via-signature commands generated for previous write operations. The performance of such write-via-signature commands is illustratively assessed by computing over multiple write operations the percentage of data pages that are determined by the write-via-signature commands to be present in the CAS system 102, with a higher percentage indicating a relatively high level of deduplication and therefore higher performance, and a lower percentage indicating a relatively low level of deduplication and therefore lower performance.

For example, the host device 101-1 can be configured to generate multiple write-via-signature commands for respective write operations, to monitor performance of the write-via-signature commands in terms of numbers of data pages present in CAS system 102, and to control a manner in which additional write-via-signature commands are generated for respective additional write operations based at least in part on comparison of the monitored performance to a specified threshold. The generating, monitoring and controlling are implemented at least in part by a machine learning system of host device 101-1.

Such a machine learning system can be part of the MPIO driver 130, or implemented elsewhere in the host device 101-1, possibly using one or more processes stored in memory 122 and executed by processor 120.

In arrangements of this type, a CAS system with a relatively high deduplication ratio will generally have a higher percentage of its write operations carried out using write-via-signature commands in place of normal write commands that each include all of the data pages of the corresponding write operation. For example, a CAS system in which about 50% to 80% of the data pages are duplicates, corresponding to a deduplication ratio of about 1:2 to 1:5, will have a similarly high percentage of its write operations carried out using write-via-signature commands, resulting in a substantial reduction in the number of data pages transmitted between the host devices and the CAS system. As indicated elsewhere herein, this advantageously translates to less traffic on network switch fabrics and faster response times for both write operations and read operations.

The above-noted machine learning system can therefore be configured to increase or decrease the percentage of write operations that utilize write-via-signature commands based at least in part on whether the monitored performance is above or below the specified threshold, respectively. For example, if the monitored performance is above the threshold, the percentage can be increased to a value as high as 100%, and if the monitored performance is below the threshold, the percentage can be decreased to a value as low as 1%. It is generally desirable in embodiments of this type to perform at least a small number of write operations using write-via-signature, rather than turning off the functionality altogether, so that the machine learning system can detect if and when the monitored performance improves to the point that the threshold is exceeded.

The extent to which the host device 101-1 utilizes the write-via-signature functionality can therefore be throttled back if the success rate is low and increased if the success rate is high, possibly on a per-volume or even a per-sub-volume basis. For example, the machine learning system can separately monitor performance of write-via-signature functionality for each of a plurality of storage volumes, and/or for each of a plurality of different portions of one or more storage volumes, and make different adjustments to the utilization extent of the write-via-signature functionality for each such storage volume or portion thereof based on its separately monitored performance.

Additionally or alternatively, the write-via-signature functionality can be turned on or turned off for particular application workload types that are respectively more or less likely to exhibit relatively high deduplication ratios. For example, the write-via-signature functionality can be enabled for certain workloads commonly associated with high deduplication ratios, such as backups to the cloud, virtual desktop infrastructure (VDI) workloads, and "boot storm" workloads, and disabled for other workloads not commonly associated with high deduplication ratios, such as database log workloads.

A wide variety of other criteria can be taken into account by the host device 101-1 in determining whether or not to use a write-via-signature command when handling a given write operation. For example, the host device 101-1 can be configured to monitor utilization of the processor 120, and to condition generation of write-via-signature commands for respective write operations on the monitored utilization being below a specified threshold. In such an embodiment, the host device 101-1 can avoid use of write-via-signature commands, and the corresponding computational resources associated with computing content-based signatures for respective data pages, when utilization of the processor 120 is relatively high. On the other hand, at those times for which utilization of the processor 120 is relatively low, the host device 101-1 may be more likely to utilize write-via-signature commands, as doing so would not put undue pressure on processor 120.

A related advantage of host-based acceleration in some embodiments is that CPU cycles or other processor resources needed to compute the content-based signatures are effectively transferred from the CAS system to the host device. It may be less expensive in some implementations to perform such operations on the host device than it would be to perform them on the CAS system.

Multiple criteria of the type described above can be applied in determining the appropriate extent to which the write-via-signature functionality should be utilized in order to obtain optimal performance benefit within the system 100. For example, the host device 101-1 can be configured to utilize the write-via-signature functionality when the deduplication ratio is above a first threshold and processor utilization is below a second threshold.

These and other operations associated with host-based acceleration of the CAS system 102 are illustratively performed at least in part by or under the control of the MPIO driver 130 and its write acceleration logic 112H in host device 101-1. Such host device components interact with the storage controller 108 and its write acceleration logic 112S of CAS system 102. In other embodiments, the above-described operations can be performed at least in part by components of the host device 101-1 other than the MPIO driver 130 and write acceleration logic 112H. For example, alternative embodiments of the host device 101-1 of system 100 need not include an MPIO driver.

The CAS system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources.

As indicated previously, the host device 101-1 and possibly the other host devices 101-2 through 101-N may be implemented in whole or in part on the same processing platform as the CAS system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 101-1 and the CAS system 102 to reside in different data centers. Numerous other distributed implementations of the host device 101-1 and the CAS system 102 are possible.

Additional examples of processing platforms utilized to implement host devices 101 and CAS system 102 in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, CAS system 102, network 104, storage devices 106, storage controller 108, storage volumes 110, write acceleration logic instances 112, signature generators 114, processor 120, memory 122 and MPIO driver 130 can be used in other embodiments.

It should be understood that the particular sets of modules and other components implemented in the system 100 as illustrated in FIG. 1 are presented by way of example only.

In other embodiments, only subsets of these components, or additional or alternative sets of components, may be used, and such components may exhibit alternative functionality and configurations.

For example, although the FIG. 1 embodiment illustrates the host device 101-1 as comprising MPIO driver 130 that contains write acceleration logic 112H, this is by way of example only, and in other embodiments the host device 101-1 need not include an MPIO driver. Embodiments of this type can instead implement the write acceleration logic 112H elsewhere in the host device 101-1, such as in the form of one or more processes stored in the memory 122 and executed by the processor 120.

The operation of the information processing system 100 will now be described in further detail with reference to the flow diagrams of the illustrative embodiments of FIGS. 2 and 3, which implement respective host-side and storage-side processes associated with host-based acceleration of a CAS system.

Figure 2:
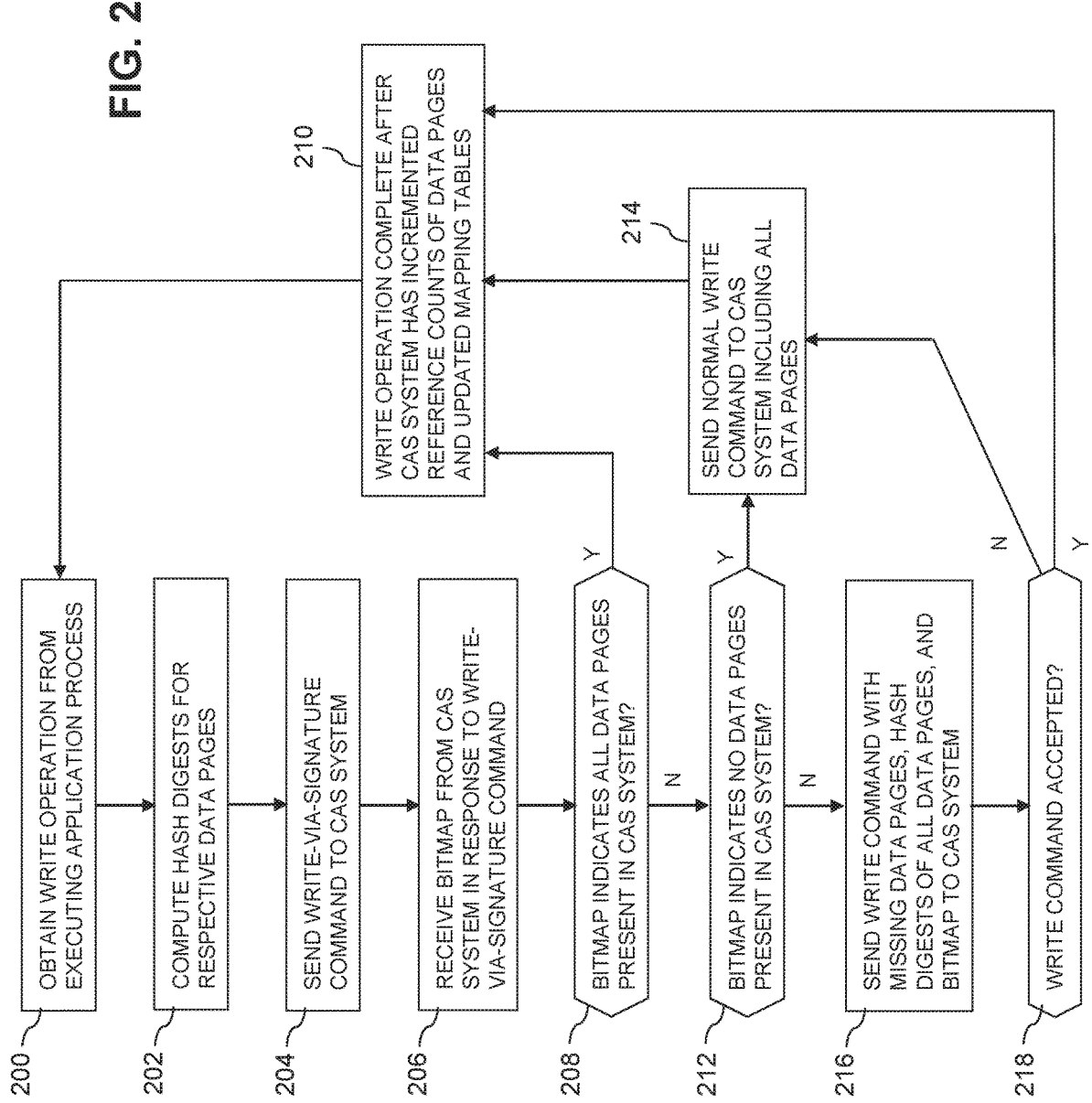
FIG. 2 is a flow diagram of a host-side process for host-based acceleration of a CAS system in an illustrative embodiment.

The host-side process as illustrated in FIG. 2 includes steps 200 through 218, and is described in the context of host device 101-1 of system 100 but is more generally applicable to a wide variety of other types of information processing systems comprising at least one host device and at least one CAS system.

In step 200, a write operation is obtained in the host device 101-1 from an executing application process, such as one of the application processes 124 executing on the processor 120 of the host device 101-1. Additionally or alternatively, the write operation can be obtained by selecting it from one of the IO queues 126 into which it was placed when generated by an executing application process. It is assumed for this embodiment that the write operation includes multiple data pages in a native page size of the CAS system 102. If the write operation is not already so configured when initially obtained, it can be preprocessed by the host device 101-1 in the manner described elsewhere herein in order to ensure that it includes multiple data pages each in the desired native page size.

In step 202, the host device 101-1 uses its signature generator 114H to compute hash digests for respective ones of the data pages of the write operation. More particularly, the signature generator 114H applies the appropriate content-based signature generation algorithm of the CAS system 102, such as an SHA1, SHA2 or SHA256 secure hashing algorithm, to each of the data pages to generate a corresponding content-based signature, illustratively a hash digest, also referred to in this embodiment as simply a "hash" of the data page. The signature generator 114H can therefore in some embodiments support multiple distinct content-based signature generation algorithms, with a particular one of them being selected for use based on the particular type of CAS system with which the host device 101-1 is currently interacting, as determined in the manner described elsewhere herein.

In step 204, the host device 101-1 sends a write-via-signature command to the storage system. The write-via-signature command illustratively comprises the hash digests of the respective data pages, as well as other information such as the particular logical storage volume, and the particular logical addresses within that logical storage volume, that are targeted by the write operation.

It should be noted that steps 200 through 204 could be iterated for respective ones of multiple IO requests. Also, different portions of the process can overlap with other portions of the process. For example, additional iterations of steps 200 through 204 can be initiated while previous iterations of steps 206 through 218 are still in progress. Accordingly, the steps are shown in sequential order for clarity and simplicity of illustration only, and certain steps can at least partially overlap with other steps.

In step 206, the host device 101-1 receives a bitmap from the CAS system 102 in response to the write-via-signature command. As indicated previously, such a bitmap illustratively indicates, for each of the data pages, whether or not that data page is already present in the CAS system 102, possibly in a different storage location than the particular storage location identified in the write-via-signature command.

In step 208, the host device 101-1 determines whether or not the bitmap indicates that all of the data pages of the write operation are present in the CAS system 102. If all of the data pages are present, even if possibly in different storage locations, the process moves to step 210, and otherwise moves to step 212 as indicated.

In step 210, the write operation is considered complete after the CAS system 102 has incremented the reference counts of the respective data pages and updated the associated mapping tables. The CAS system 102 illustratively sends an acknowledgement of the successful completion of such incrementing and updating operations to the host device 101-1. Accordingly, if the CAS system 102 already has all of the data pages of the write operation, even though possibly in different storage locations, the write operation completes without the host device 101-1 having to send any of those data pages to the CAS system 102, thereby conserving significant amounts of network bandwidth in the system 100. The process then returns to step 200 as shown in order to process another write operation.

In step 212, the host device 101-1 determines whether or not the bitmap indicates that none of the data pages of the write operation are present in the CAS system 102. Responsive to an affirmative determination in this step, the process moves to step 214, and otherwise moves to step 216 as indicated.

In step 214, the host device 101-1 sends a normal write command to the CAS system 102, including all of the data pages. The process then moves to step 210, in which the write operation is considered complete after the CAS system 102 has incremented the reference counts of the respective data pages and updated the associated mapping tables, and illustratively acknowledged same back to the host device 101-1. In some embodiments, a bitmap indicating that all pages are present can serve as such an acknowledgement, for example, if the CAS system 102 completes the incrementing and updating prior to sending the bitmap. Other types of acknowledgments can be used in other embodiments.

In step 216, which is reached if the bitmap received from the CAS system 102 indicates that one or more of the pages of the write operation are present and one or more of the pages of the write operation are not present, the host device 101-1 sends a write command with the missing data pages, the hash digests of all data pages, and the bitmap to the CAS system 102. The process then moves to step 218.

In step 218, the host device 101-1 determines whether or not the write command sent in step 216 has been accepted by the CAS system 102. If the write command has not been accepted, the process moves to step 214 and then to step 210, and otherwise moves directly to step 210 as indicated. This step is configured to avoid any possible race condition that might otherwise arise if the hash digests of one or more of the data pages were deleted from the CAS system 102 after generation of the bitmap. For example, it is possible but very unlikely that one or more hash digests may be deleted if their deletion prevention timers expired and their reference counts were reduced to zero by another process.

The CAS system 102 in this embodiment atomically commits the write operation, by completing either the write-via-signature command sent in step 204, the normal write command sent in step 214 or the write command with missing data pages, hash digests of all data pages and bitmap in step 216.

Figure 3:
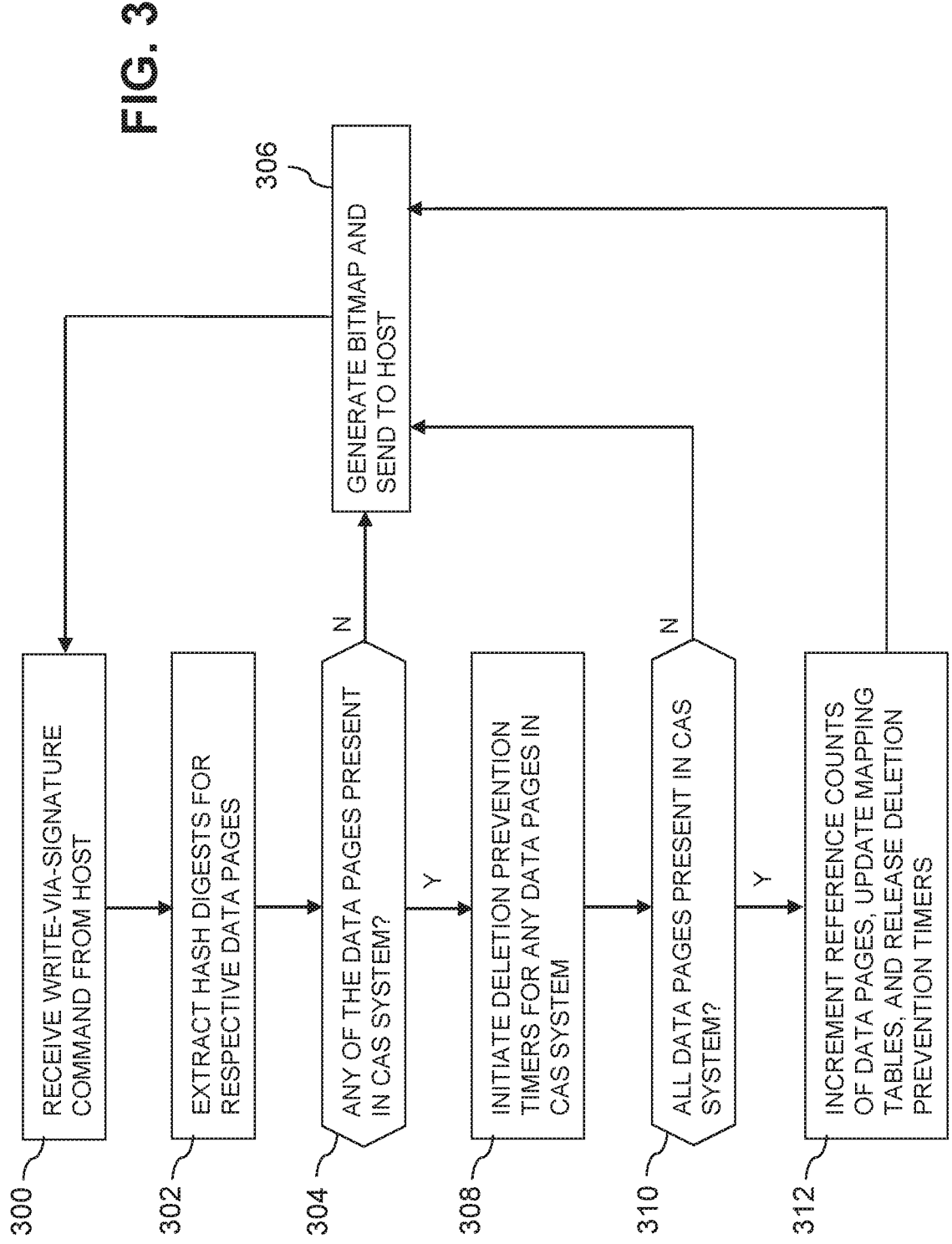
FIG. 3 is a flow diagram of a storage-side process supporting host-based acceleration of a CAS system and showing the manner in which a write-via-signature command generated by a host device in FIG. 2 is processed by the CAS system in an illustrative embodiment.

The storage-side process as illustrated in FIG. 3 includes steps 300 through 312, and is described in the context of CAS system 102 of system 100 but is more generally applicable to a wide variety of other types of information processing systems comprising at least one host device and at least one CAS system.

In step 300, the CAS system 102 receives a write-via-signature command from the host device 101-1. As noted above, the write-via-signature command illustratively comprises the hash digests of the respective data pages, as well as other information such as the particular logical storage volume, and the particular logical addresses within that logical storage volume, that are targeted by the write operation.

In step 302, the CAS system 102 extracts from the write-via-signature command the hash digests for the respective data pages.

In step 304, the CAS system 102 determines if any of the corresponding data pages are present in the CAS system 102 by determining if the hash digests of those pages are among the hash digests of data pages already stored by the CAS system 102, possibly in storage locations other than that targeted by the write operation. If none of the data pages are present, the process moves to step 306, and otherwise moves to step 308 as indicated.

In step 306, the CAS system 102 generates the previously-described bitmap for the write-via-signature command and sends it to the host device 101-1. The process then returns to step 300 to process the next write-via-signature command received from the host.

In step 308, the CAS system 102 initiates deletion prevention timers of the type previously described for any of the data pages that were found to be within the CAS system 102. Such deletion prevention timers are illustratively associated with the hash digests of the respective pages and prevent each of those hash digests and its corresponding data page from being deleted should its reference count reach zero before the write operation is completed. The process then moves to step 310 as indicated.

In step 310, the CAS system 102 determines whether or not all of the data pages of the write-via-signature command are present in the CAS system 102. If all of the data pages are present, the process moves to step 312, and otherwise moves to step 306 to generate the bitmap as previously described.

In step 312, the CAS system 102 increments the reference counts of the data pages, updates the mapping tables, and releases the deletion prevention timers. The process then moves to step 306 to generate the bitmap as previously described. As mentioned above, receipt of the bitmap indicating that all data pages were present in the CAS system 102 can serve as an acknowledgement to the host device 101-1 that the write operation has been successfully completed.

It should be noted that other types of write commands can be processed at least in part in parallel with one or more of the steps of FIG. 3, such as normal write commands that include all of the data pages for respective other write operations.

The particular processing operations and other system functionality described in conjunction with the flow diagrams of FIGS. 2 and 3 are presented by way of illustrative example only, and should not be construed as limiting the scope of the disclosure in any way. Alternative embodiments can use other types of processing operations for host-based acceleration of a CAS system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different host-based acceleration processes for respective different write operations or for different host devices, storage systems or portions thereof within a given information processing system.

Functionality such as that described in conjunction with the flow diagrams of FIGS. 2 and 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, one or more host devices such as host devices 101 in system 100 that are each configured to perform the steps of the FIG. 2 host-side process can be implemented as part of what is more generally referred to herein as a processing platform comprising one or more processing devices each comprising a processor coupled to a memory.

Similarly, a storage controller such as storage controller 108 of CAS system 102 in system 100 that is configured to perform the FIG. 3 storage-side process can be implemented as part of a processing platform comprising one or more processing devices each comprising a processor coupled to a memory, possibly the same processing platform that implements one or more of the host devices 101.

A given such processing device may correspond to one or more virtual machines or other types of virtualization infrastructure such as Docker containers or Linux containers (LXCs). The host devices 101, storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, a given CAS system comprises a clustered CAS system configured to support host-based acceleration functionality as disclosed herein. A clustered CAS system is also referred to herein as a distributed CAS system.

An illustrative embodiment of such a CAS system will now be described with reference to FIG. 4. In this embodiment, a CAS system 402 comprises a plurality of storage devices 406 and an associated storage controller 408. The CAS system 402 may be viewed as a particular implementation of the CAS system 102, and accordingly is assumed to be coupled to host devices 101 via network 104 in system 100.

The storage controller 408 in the present embodiment is configured to support host-based acceleration functionality of the type previously described in conjunction with FIGS.

1 through 3. For example, the CAS system 402 illustratively implements a storage-side process such as that shown in FIG. 3, to support a corresponding host-side process such as that shown in FIG. 2, in order to achieve host-based acceleration of the CAS system 402.

The storage controller 408 includes distributed modules 412 and 414, which are configured to operate in a manner similar to that described above for respective corresponding write acceleration logic 112S and signature generator 114S of the storage controller 108 of system 100. Module 412 is more particularly referred to as distributed write acceleration logic, and illustratively comprises multiple write acceleration logic instances on respective ones of a plurality of distinct nodes, with the multiple write acceleration logic instances collectively supporting host-based acceleration functionality as disclosed herein. Module 414 more particularly comprises a distributed signature generator with different instances thereof also being implemented on respective ones of the distinct nodes.

Figure 4:
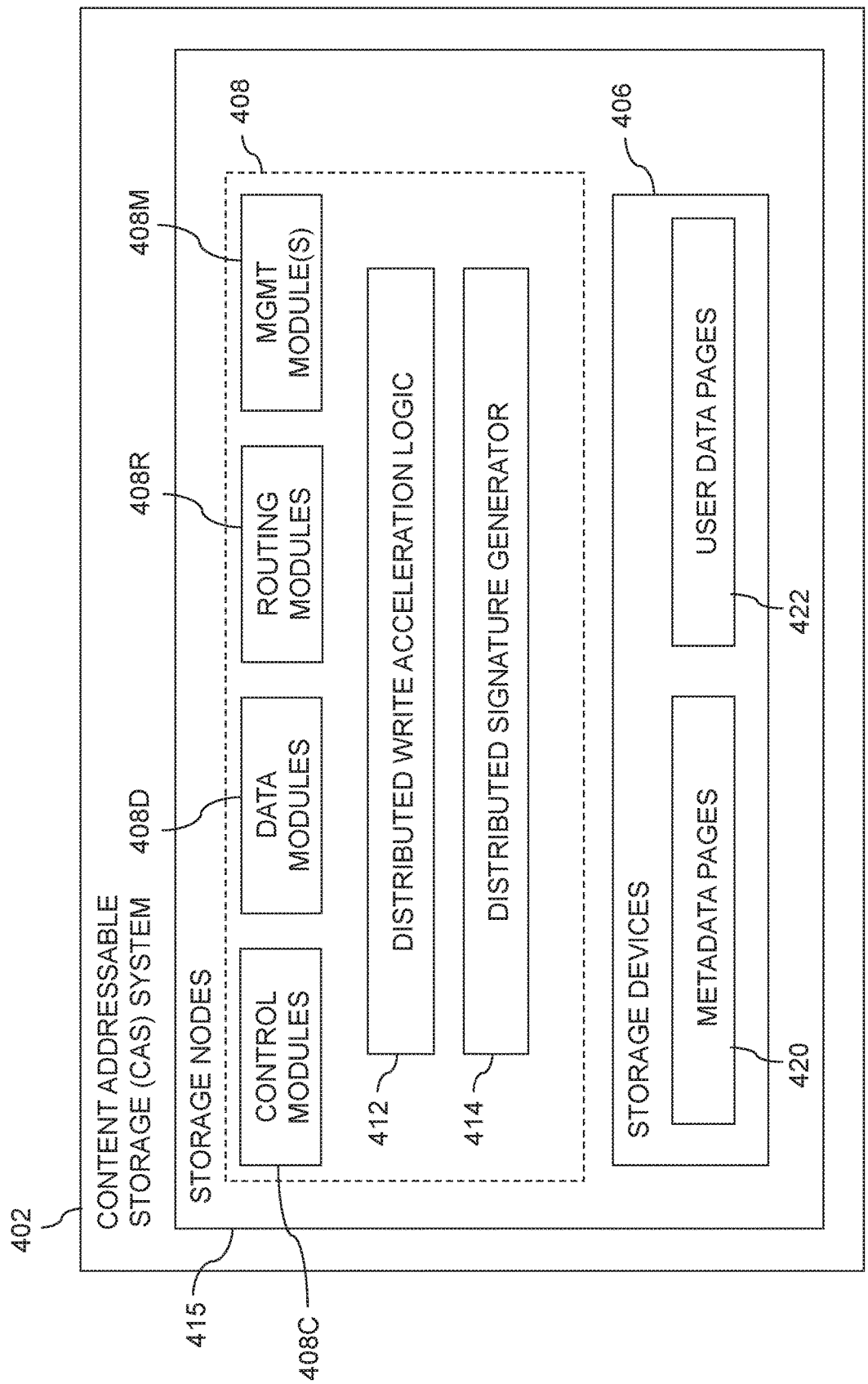
FIG. 4 shows a CAS system having a distributed storage controller configured to support host-based acceleration functionality in an illustrative embodiment.

The CAS system 402 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the CAS system 402 is assumed to be implemented using at least one processing device comprising a processor coupled to a memory.

The storage controller 408 of the CAS system 402 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 is referred to as distributed storage controller 408.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the CAS system 402.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415. A given set of processing modules implemented on a particular one of the storage nodes 415 therefore illustratively includes at least one control module 408C, at least one data module 408D and at least one routing module 408R, and possibly a management module 408M.

Communication links may be established between the various processing modules of the distributed storage controller 408 using well-known communication protocols such as TCP/IP and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the functionality for host-based acceleration of a CAS system of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the CAS system 402. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406.

The CAS system 402 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the CAS system 402 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, in a given set of n user data pages representing a portion of the user data pages 422, each of the user data pages is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 402 is illustratively distributed among the control modules 408C.

The functionality for host-based acceleration of a CAS system provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a write acceleration logic instance that engages corresponding write acceleration logic instances in all of the control modules 408C and routing modules 408R in order to support host-based acceleration of the CAS system 402.

By way of example, in some embodiments, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The distributed storage controller in this example is configured to group consecutive pages into page groups, to arrange the page groups into slices, and to assign the slices to different ones of the control modules 408C. For example, if there are 1024 slices distributed evenly across the control modules 408C, and there are a total of 16 control modules in a given implementation, each of the control modules "owns" 1024/16=64 slices. In such arrangements, different ones of the slices are assigned to different ones of the control modules 408C such that control of the slices within the storage controller 408 of the CAS system 402 is substantially evenly distributed over the control modules 408C of the storage controller 408.

The data modules 408D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 408C but are accessed using the data modules 408D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 402 each illustratively comprise one or more IO operations directing that at least one data item of the CAS system 402 be written to in a particular manner. A given write request is illustratively received in the CAS system 402 from a host device over a network. In some embodiments, a write request is received in the distributed storage controller 408 of the CAS system 402, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 408C, data modules 408D and routing modules 408R of the storage nodes 415 communicate with one another over a high-speed internal network such as an InfiniBand network. The control modules 408C, data modules 408D and routing modules 408R coordinate with one another to accomplish various IO processing tasks.

The write requests from the host devices identify particular data pages to be written in the CAS system 402 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The CAS system 402 utilizes a two-level mapping process to map logical block addresses to physical block addresses. The first level of mapping uses an A2H table and the second level of mapping uses an HMD table, with the A2H and HMD tables corresponding to respective logical and physical layers of the content-based signature mapping within the CAS system 402. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 406. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 402. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 402 correspond to respective physical blocks of a physical layer of the CAS system 402. The user data pages of the logical layer are organized by LBA and have reference via respective content-based signatures to particular physical blocks of the physical layer.

Each of the physical blocks has an associated reference count that is maintained within the CAS system 402. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement functionality for host-based acceleration of a CAS system in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a CAS system can be used in other embodiments.

Illustrative embodiments of a storage system with functionality for host-based acceleration of a CAS system as disclosed herein can provide a number of significant advantages relative to conventional arrangements.

For example, these embodiments advantageously avoid the need for a host device to send all of the data pages of a given write operation to the storage system over a network, thereby significantly reducing bandwidth congestion on one or more switch fabrics of the network, and improving storage system response times.

More particularly, some embodiments implement "write-via-signature" functionality that can substantially reduce the amount of data transmitted between a host device and a CAS system, thereby accelerating the processing of both write operations and read operations by the CAS system.

Such arrangements provide a significant advance over conventional approaches which tend to ignore deduplication in handling write operations and instead generally require the transmission of all data pages of each write operation with only very limited exceptions such as writing all-zero data pages.

Furthermore, illustrative embodiments herein do not significantly undermine the performance of the storage system in handling normal IO requests not subject to host-based acceleration as disclosed herein.

Another advantage of host-based acceleration in some embodiments is that CPU cycles or other processor resources needed to compute content-based signatures for data pages of a write operation are effectively transferred from the CAS system to the host device. It may be less expensive in some implementations to perform such operations on the host device than it would be to perform them on the CAS system.

Illustrative embodiments provide substantial advantages over conventional approaches in a wide variety of different IO request processing contexts. For example, significant improvements are achieved for backups and other similar workloads that are not latency-sensitive and have high deduplication ratios.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for host-based acceleration of a CAS system will now be described in greater detail with reference to FIGS. 5 and 6. Although described in the context of system 100, these platforms may also be used to implement at least portions of other information processing systems in other embodiments.

Figure 5:
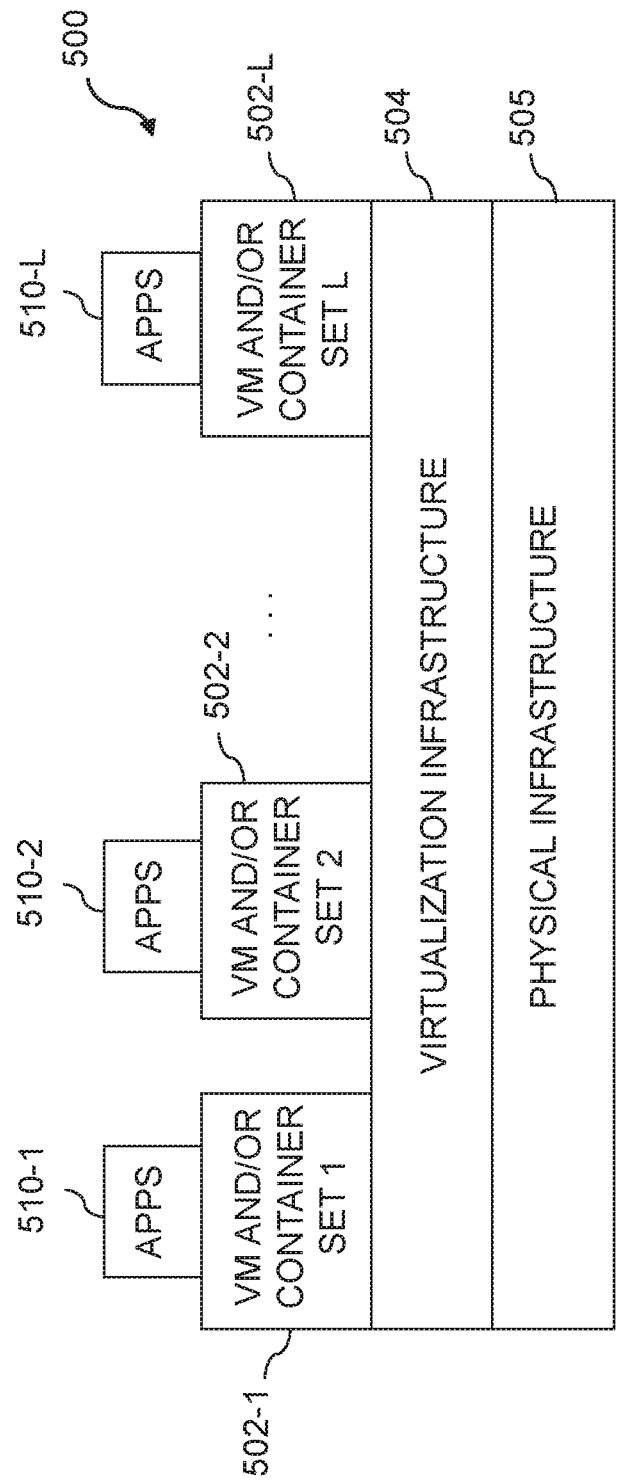
FIGS. 5 and 6 show examples of processing platforms that may be utilized to implement at least a portion of an information processing system in illustrative embodiments.
Figure 6:
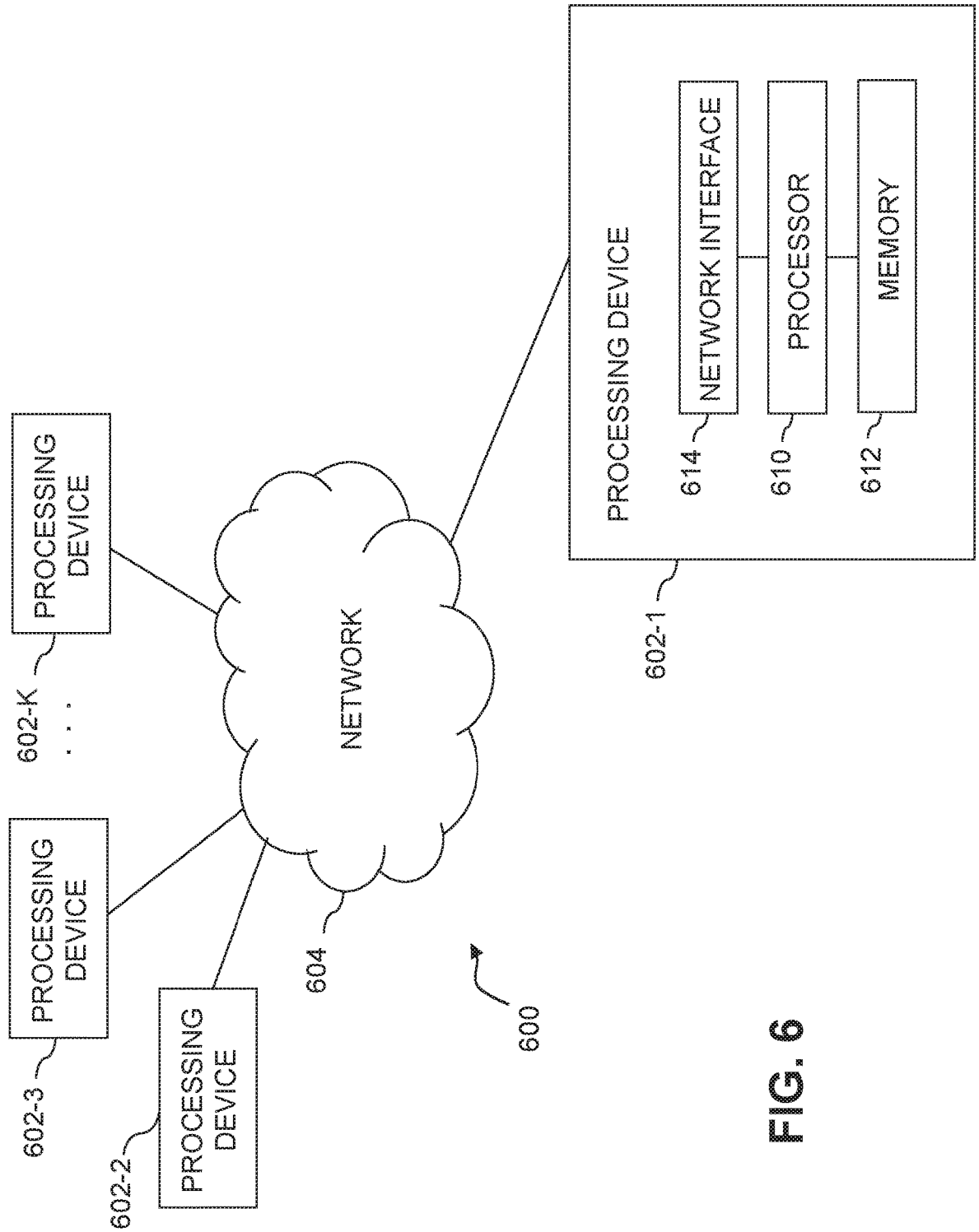

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for host-based acceleration of a CAS system of the type described above using one or more processes running on a given one of the VMs. For example, each of the VMs can implement write acceleration logic instances and/or other components for supporting functionality for host-based acceleration of the CAS system 102 in the system 100.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for host-based acceleration of a CAS system of the type described above. For example, a container host device supporting multiple containers of one or more container sets can implement one or more instances of write acceleration logic and/or other components for supporting functionality for host-based acceleration of a CAS system in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for host-based acceleration of a CAS system of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, write acceleration logic instances, signature generators and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to obtain content-based signatures for respective data pages of at least one write operation;
   to send the content-based signatures to a content addressable storage system;
   to receive from the content addressable storage system information indicating for each of the content-based signatures whether or not the corresponding data page is present in the content addressable storage system; and
   responsive to the information received from the content addressable storage system indicating that one or more of the corresponding data pages are not present in the content addressable storage system, to send the one or more corresponding data pages to the content addressable storage system;
   wherein responsive to the information received from the content addressable storage system indicating that the one or more corresponding data pages are not present in the content addressable storage system and one or more other data pages are present in the content addressable storage system, sending the one or more corresponding data pages to the content addressable storage system comprises:
   generating at least one write command that includes:
   (i) the one or more corresponding data pages that are not present; and
   (ii) the content-based signatures of at least the one or more other data pages that are present; and
   sending the at least one write command to the content addressable storage system.

2. The apparatus of claim 1 wherein said at least one processing device comprises a host device configured to communicate with the content addressable storage system over a network, the host device comprising a multi-path input-output driver configured to control delivery of input-output operations from the host device to the content addressable storage system over selected ones of a plurality of paths through the network, the input-output operations comprising write operations and read operations.

3. The apparatus of claim 2 wherein the paths are associated with respective initiator-target pairs and wherein each of a plurality of initiators of the initiator-target pairs comprises a corresponding host bus adaptor of the host device and each of a plurality of targets of the initiator-target pairs comprises a corresponding port of the content addressable storage system.

4. The apparatus of claim 1 wherein obtaining content-based signatures for respective data pages of at least one write operation comprises:
   determining a native page size and a content-based signature generation algorithm utilized by the content addressable storage system;
   separating data of the write operation into a plurality of data pages each having the native page size; and
   computing content-based signatures for respective ones of the data pages of the write operation utilizing the content-based signature generation algorithm.

5. The apparatus of claim 1 wherein the information received from the content addressable storage system and indicating for each of the content-based signatures whether or not the corresponding data page is present in the content addressable storage system comprises a bitmap, the bitmap comprising a plurality of entries for respective ones of the data pages with each such entry indicating whether or not the corresponding data page is present in the content addressable storage system.

6. The apparatus of claim 1 wherein said at least one processing device is further configured:
- responsive to the information received from the content addressable storage system indicating that all of the corresponding data pages are present in the content addressable storage system, to designate the write operation as complete without sending any of the data pages to the content addressable storage system;
- wherein the content addressable storage system increments respective reference counts for the content-based signatures of the corresponding data pages in conjunction with sending the information to the processing device that indicates that all of the corresponding data pages are present, and updates one or more associated mapping tables utilized for logical address to physical address mapping in the content addressable storage system.

7. The apparatus of claim 1 wherein for any of the data pages that are present in the content addressable storage system, the content addressable storage system initiates respective deletion prevention timers for respective ones of their content-based signatures in conjunction with sending the information to the processing device, wherein a particular one of the deletion prevention timers is configured to prevent the corresponding content-based signature from being deleted in the event its reference count reaches zero before expiration of the timer, and further wherein after expiration of the particular deletion prevention counter, its corresponding content-based signature is deleted responsive to its reference count reaching zero.

8. The apparatus of claim 1 wherein responsive to the information received from the content addressable storage system indicating that none of the corresponding data pages are present in the content addressable storage system, sending the one or more corresponding data pages to the content addressable storage system comprises:
- generating a write command that includes:
  - (i) all of the data pages; and
  - (ii) specification of a logical storage volume and logical address information for the data pages within the logical storage volume; and
- sending the write command to the content addressable storage system.

9. The apparatus of claim 1 wherein the at least one write command further includes:
- (iii) specification of a logical storage volume and logical address information for the data pages within the logical storage volume; and
- (iv) the information indicating for each of the content-based signatures whether or not the corresponding data page is present.

10. The apparatus of claim 1 wherein said at least one processing device is further configured:
- to generate multiple write-via-signature commands for respective write operations;
- to monitor performance of the write-via-signature commands in terms of numbers of data pages present in the content addressable storage system; and
- to control a manner in which additional write-via-signature commands are generated for respective additional write operations based at least in part on comparison of the monitored performance to a specified threshold;
- wherein the generating, monitoring and controlling are implemented at least in part by a machine learning system.

11. The apparatus of claim 1 wherein said at least one processing device is further configured:
- to monitor utilization of the processor; and
- to condition generation of write-via-signature commands for respective write operations on the monitored utilization being below a specified threshold.

12. The apparatus of claim 1 wherein the content-based signatures comprise respective hash digests of respective data pages of the one or more write operations with a given one of the hash digests being generated by applying a secure hashing algorithm to content of a corresponding one of the data pages.

13. An apparatus comprising:
- at least one processing device comprising a processor coupled to a memory;
- said at least one processing device being configured:
- to obtain content-based signatures for respective data pages of at least one write operation;
- to send the content-based signatures to a content addressable storage system;
- to receive from the content addressable storage system information indicating for each of the content-based signatures whether or not the corresponding data page is present in the content addressable storage system; and
- responsive to the information received from the content addressable storage system indicating that one or more of the corresponding data pages are not present in the content addressable storage system, to send the one or more corresponding data pages to the content addressable storage system;
- wherein sending the content-based signatures to the content addressable storage system comprises:
- generating a write-via-signature command that includes the content-based signatures and specifies a logical storage volume and logical address information for the data pages within the logical storage volume; and
- sending the write-via-signature command to the content addressable storage system.

14. The apparatus of claim 13 wherein the write-via-signature command comprises a vendor unique command of a designated storage protocol.

15. A method comprising:
- obtaining content-based signatures for respective data pages of at least one write operation;
- sending the content-based signatures to a content addressable storage system;
- receiving from the content addressable storage system information indicating for each of the content-based signatures whether or not the corresponding data page is present in the content addressable storage system; and
- responsive to the information received from the content addressable storage system indicating that one or more of the corresponding data pages are not present in the content addressable storage system, sending the one or more corresponding data pages to the content addressable storage system;
- wherein responsive to the information received from the content addressable storage system indicating that the one or more corresponding data pages are not present in the content addressable storage system and one or more other data pages are present in the content addressable storage system, sending the one or more corresponding data pages to the content addressable storage system comprises:
- generating at least one write command that includes:
  - (i) the one or more corresponding data pages that are not present; and (ii) the content-based signatures of at least the one or more other data pages that are present; and sending the at least one write command to the content addressable storage system; and wherein the method is implemented by at least one processing device comprising a processor coupled to a memory.

16. The method of claim 15 wherein said at least one processing device is further configured:

responsive to the information received from the content addressable storage system indicating that all of the corresponding data pages are present in the content addressable storage system, to designate the write operation as complete without sending any of the data pages to the content addressable storage system;

wherein the content addressable storage system increments respective reference counts for the content-based signatures of the corresponding data pages in conjunction with sending the information to the processing device that indicates that all of the corresponding data pages are present, and updates one or more associated mapping tables utilized for logical address to physical address mapping in the content addressable storage system.

17. The method of claim 15 wherein the at least one write command further includes:

(iii) specification of a logical storage volume and logical address information for the data pages within the logical storage volume; and (iv) the information indicating for each of the content-based signatures whether or not the corresponding data page is present.

18. A computer program product comprising a non-transitory processor-readable storage medium having stored therein program code of one or more software programs, wherein the program code when executed by at least one processing device causes said at least one processing device:

to obtain content-based signatures for respective data pages of at least one write operation;

to send the content-based signatures to a content addressable storage system;

to receive from the content addressable storage system information indicating for each of the content-based signatures whether or not the corresponding data page is present in the content addressable storage system; and responsive to the information received from the content addressable storage system indicating that one or more of the corresponding data pages are not present in the content addressable storage system, to send the one or more corresponding data pages to the content addressable storage system;

wherein responsive to the information received from the content addressable storage system indicating that the one or more corresponding data pages are not present in the content addressable storage system and one or more other data pages are present in the content addressable storage system, sending the one or more corresponding data pages to the content addressable storage system comprises:

generating at least one write command that includes:

(i) the one or more corresponding data pages that are not present; and (ii) the content-based signatures of at least the one or more other data pages that are present; and sending the at least one write command to the content addressable storage system.

19. The computer program product of claim 18 wherein said at least one processing device is further configured:

responsive to the information received from the content addressable storage system indicating that all of the corresponding data pages are present in the content addressable storage system, to designate the write operation as complete without sending any of the data pages to the content addressable storage system;

wherein the content addressable storage system increments respective reference counts for the content-based signatures of the corresponding data pages in conjunction with sending the information to the processing device that indicates that all of the corresponding data pages are present, and updates one or more associated mapping tables utilized for logical address to physical address mapping in the content addressable storage system.

20. The computer program product of claim 18 wherein the at least one write command further includes:

(iii) specification of a logical storage volume and logical address information for the data pages within the logical storage volume; and (iv) the information indicating for each of the content-based signatures whether or not the corresponding data page is present.

* * * * *